(12) United States Patent
Kurihara

(10) Patent No.: US 6,772,027 B2
(45) Date of Patent: Aug. 3, 2004

(54) METHOD OF CONFIGURING VEHICLE ASSEMBLY LINE

(75) Inventor: Tadashi Kurihara, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 132 days.

(21) Appl. No.: 10/111,242

(22) PCT Filed: Sep. 7, 2001

(86) PCT No.: PCT/JP01/07797
§ 371 (c)(1),
(2), (4) Date: Apr. 17, 2002

(87) PCT Pub. No.: WO02/20336
PCT Pub. Date: Mar. 14, 2002

(65) Prior Publication Data
US 2002/0152615 A1 Oct. 24, 2002

(30) Foreign Application Priority Data
Sep. 7, 2000 (JP) ........................ 2000-271679

(51) Int. Cl.⁷ .............................................. G06F 19/00
(52) U.S. Cl. ........................... 700/99; 700/100; 29/430; 29/783
(58) Field of Search .......................... 700/99, 115, 100; 29/428, 429, 430, 783

(56) References Cited

U.S. PATENT DOCUMENTS 4,683,651 A * 8/1987 Taketani et al. .............. 29/786
5,166,874 A * 11/1992 Nomaru et al. .............. 700/100
5,699,242 A * 12/1997 Togawa et al. ................. 700/5
6,324,749 B1 * 12/2001 Katsuura et al. ............... 29/783
6,516,239 B1 * 2/2003 Madden et al. ............. 700/115

FOREIGN PATENT DOCUMENTS

| JP | 2-53536 | 2/1990 |
| JP | 6-56059 | 3/1994 |
| JP | 6-155198 | 6/1994 |
| JP | 7-277239 | 10/1995 |

* cited by examiner

Primary Examiner—Albert W. Paladini
(74) Attorney, Agent, or Firm—Merchant & Gould, P.C.

(57) ABSTRACT

A method of configuring a vehicle assembly line includes the steps of classifying a vehicle assembly line (10) into at least three zones (20 to 60) by grouping assembly parts based on the positions for installation operation, assembly procedures, and the functions of the parts, setting, for each classified zone, a standard assembly man-hour used commonly for all vehicle models, comparing the standard assembly man-hour with the assembly man-hour for each vehicle model and zone, and positioning the zone with the largest assembly man-hour for each zone adjacent to the zone with the next larger assembly man-hour, whereby a middle tact (M) can be adopted between a long tact (L) and a short tact (S), and the average speed of the line and accordingly the productivity can be increased by moving the assembly line by selectively using the three speeds.

5 Claims, 6 Drawing Sheets

FIG. 2

(EXAMPLE OF ZONING)

WIRING/PIPING & COMMUNICATION EQUIPMENT — 20
- WIRING
- PIPING
- CABLES
- WORK INSIDE ENGINE ROOM
- OTHER PRE-ASSEMBLY WORK

UNDERSIDE EQUIPMENT — 40
- SUSPENSION
- (TIRES)
- ENGINE
- OTHER UNDERSIDE WORK

INTERIOR EQUIPMENT — 30
- INSTRUMENT PANEL
- PEDALS
- FLOOR MATS
- CEILING LINING
- SIDE LINING
- OTHER INTERIOR WORK

EXTERIOR EQUIPMENT — 50
- TIRES
- WINDOW PANES
- BUMPERS
- DOORS
- SEATS
- ENGINE ROOM POST-WORK
- OTHER EXTERIOR WORK

METHOD OF CONFIGURING VEHICLE ASSEMBLY LINE

TECHNICAL FIELD

This invention relates to an improvement in a method of configuring a vehicle assembly line for assembling vehicle bodies of different models by takt time control.

BACKGROUND ART

It has been attempted on vehicle assembly lines to reduce the number of assembly lines and consolidate operations by making a plurality of vehicles of different models (model "A", model "B") flow in a common line and doing assembly there, which is called a mixed-model process. As an invention related to the mixed-model process, Japanese Patent No. 2920801 entitled "Transferring Method for Vehicle Assembly Line," for example, is known.

In this transferring method, a plurality of vehicles of each of model "A" and model "B," which models are different in the number of assembling processes, are aligned in a vehicle group, and the vehicles of models "A" and "B" in groups sequentially flow in the assembly line. When model "A" has a larger number of assembling processes than model "B," the line speed is switched to a long takt time, that is, a low speed, immediately before a vehicle of model "A" comes into the assembly line. While a vehicle(s) of model "A" are present in the assembly line, the assembly line is maintained in the long takt time. When all vehicles of model "A" have gone out from the line exit and the assembly line has no vehicles of model "A" but vehicles of model "B," the assembly line is switched to a short takt time, that is, the line speed is switched to a high speed. This leads to increased productivity.

In the mixed-model assembling process of the above publication in which both vehicles of model "A" which take time in assembly and vehicles or model "B" which are relatively easily assembled are processed, the processing is performed in a long takt time when a vehicle(s) of model "A" are in the line, and is performed in a short takt time when only vehicles of model "B" are in the line. As compared with a case where the assembly line is operated at the line speed of only a long takt time, the operation of the assembly line at two speeds of long and short takt times as in the above publication increases an average line speed, thereby increasing productivity by the increased amount.

However, when only one vehicle of a model having a larger number of assembling processes is present in the assembly line, the long takt time should be selected, preventing much increase in the effect of increasing the average line speed.

DISCLOSURE OF THE INVENTION

It is thus an object of the present invention to provide a method of configuring an assembly line which enables increase in the line speed when certain conditions are satisfied even with a vehicle(s) of a model having a larger number of assembly man-hours (a larger number of assembly processes) present in the assembly line.

According to a first aspect of the present invention, there is provided a method of configuring a vehicle assembly line through which vehicle bodies of a plurality of different models having undergone painting are transferred, during which components are sequentially installed, inspected, and repaired as necessary, to provide finished vehicles, which method comprises the steps of: grouping the components to be installed based on mounting positions, installing procedures, and functions thereof so as to divide the vehicle assembly line into at least three zones; setting standard assembly man-hours common for the different models for each divided zone; comparing the standard assembly man-hours with assembly man-hours of each zone for each model; and laying side by side a zone having a largest number of assembly man-hours and a zone having a second largest number of assembly man-hours.

Thus dividing the vehicle assembly line into the at least three zones, setting the average assembly man-hours or each zone, comparing the average assembly man-hours with assembly man-hours of each zone for each model, and laying side by side a zone having a largest number of assembly man-hours and a zone having a second largest number of assembly man-hours enable the adoption of a middle takt time which is intermediate between a long takt time and a short takt time.

The above method of configuring a vehicle assembly line preferably further comprises the step of setting the vehicle assembly line to run in a long takt time when vehicles of a model having a larger number of assembly man-hours are present in the zones having the first and second largest numbers of assembly man-hours, and to run in a middle takt time when a vehicle of a model having a larger number of assembly man-hours is present in any zone other than the zones having the first and second largest numbers of assembly man-hours, and to run in a short takt time when no vehicles of a model having a larger number of assembly man-hours are present in the assembly line. This enables fine takt time selection, increasing productivity.

The at least three zones preferably comprise a wiring/piping and communication equipment zone, an interior equipment zone, an underside equipment zone, an exterior equipment zone, and a complex quality assurance zone.

In a preferred embodiment, the above method of configuring a vehicle assembly line further comprises the step of calculating man-hour ratios as the assembly man-hours of the respective zones for each of the different models prior to the comparing step, wherein the top two ranks in the man-hour ratios of one of the models having a larger number of assembly man-hours correspond to the wiring/piping and communication equipment one and the interior equipment zone, and the next higher one of the man-hour ratios following the top two ranks corresponds to the underside equipment zone, and the exterior equipment zone and the complex quality assurance zone have a constant man-hour ratio lower than the man-hour ratios of the top three ranks, and therefore the wiring/piping and communication equipment zone and the interior equipment zone are first disposed side by side, and the underside equipment zone is disposed adjacent to these zones, followed by the disposition of the exterior equipment zone and the complex quality assurance zone.

BRIEF DESCRIPTION OF THE DRAWINGS

A preferred embodiment of the present invention will be described in detail below with reference to the accompanying drawings, in which.

BEST MODE FOR CARRYING OUT THE INVENTION

Figure 1:
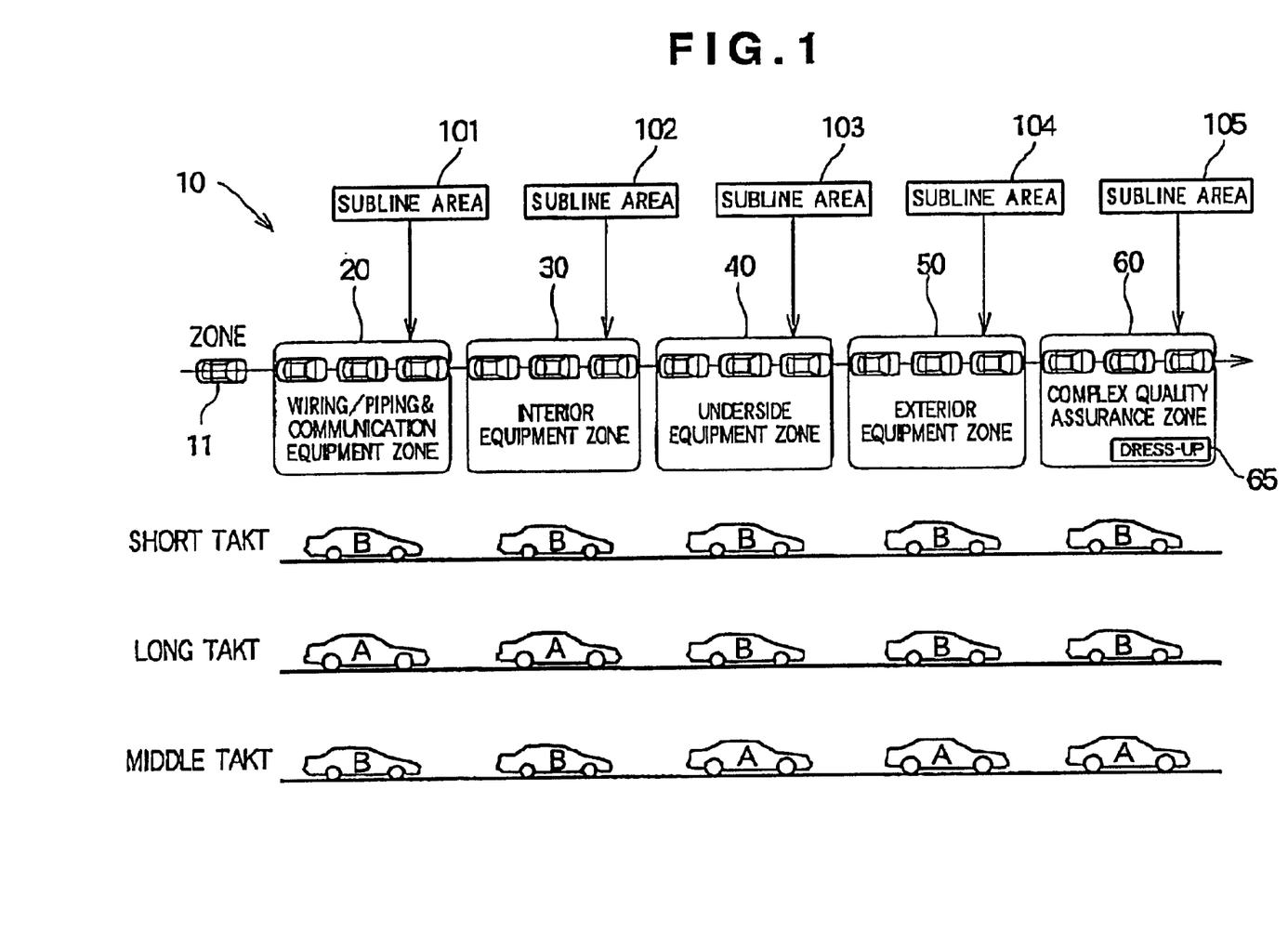
FIG. 1 is a schematic explanatory view of a vehicle assembly line provided by a configuring method according to the present invention.

Referring to FIG. 1, a vehicle assembly line 10 has: a wiring/piping and communication equipment zone 20 in which wiring/piping- and communication-related components are sequentially installed in a vehicle body 11 having undergone a painting process, and inspected, and repaired as necessary; an interior equipment zone 30 in which interior components are sequentially installed, inspected, and repaired as necessary; an underside equipment zone 40 in which underside components are sequentially installed, inspected, and repaired as necessary; an exterior equipment zone 50 in which exterior components are sequentially installed, inspected, and repaired as necessary; and a complex quality assurance zone 60 in which items which have not been repaired in the zones 20 to 50 are inspected and repaired (items which cannot be repaired completely in repair stations in the respective zones are also repaired). These zones are arranged in this order.

Line takt times (cycle times) as shown in FIG. 1 are set for the assembly line 10. Subline areas (101 to 105) for preparing and supplying subassemblies are provided in communication with the assembly line 10. The subline areas (101 to 105) are either synchronous or asynchronous with the assembly line 10. Switching of the line takt times will be described later with reference to FIG. 3.

Figure 2:
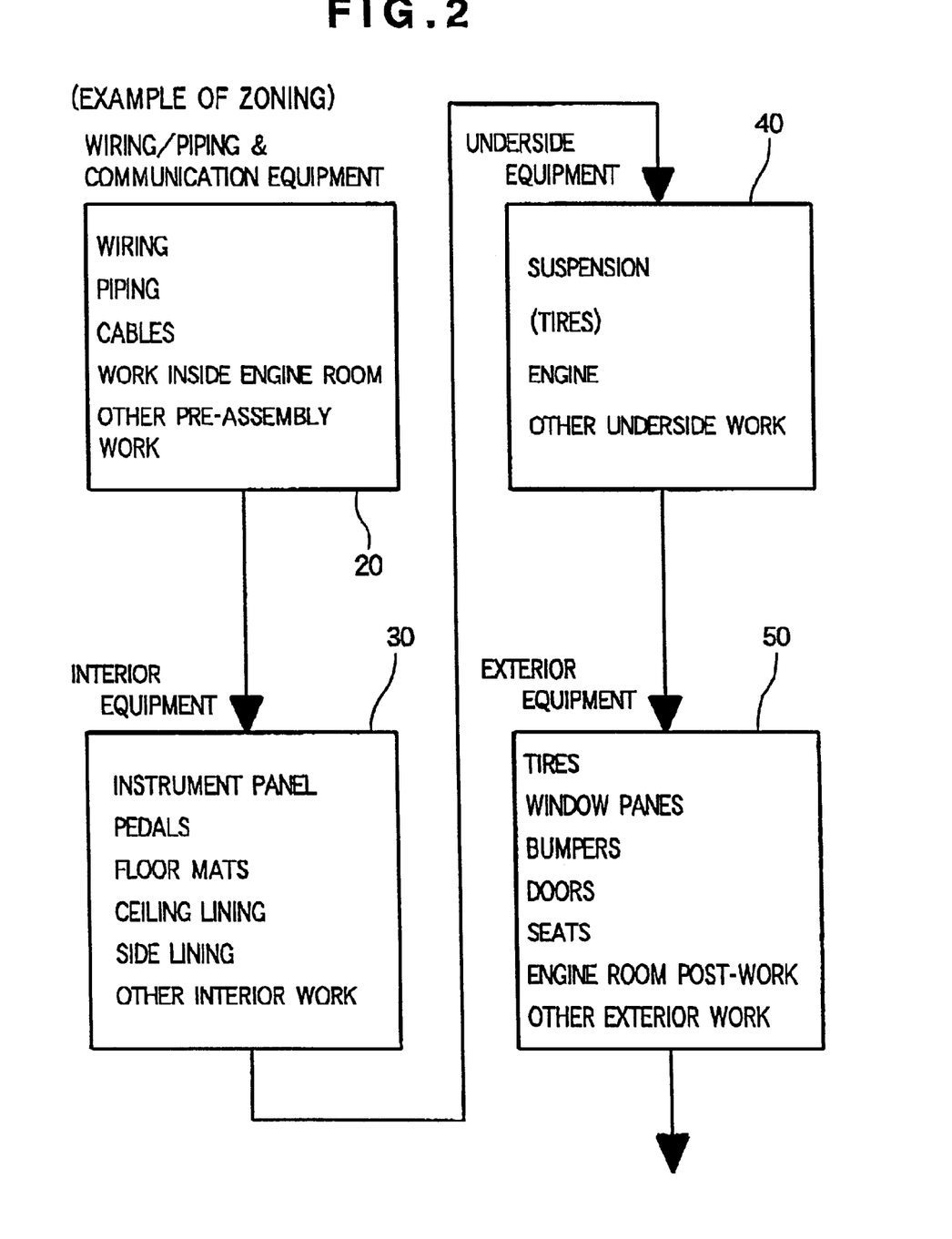
FIG. 2 is an explanatory view of zoning in the vehicle assembly line.

Next, with reference to FIG. 2, zoning of the vehicle assembly line according to the present invention is described.

Wiring, piping, cabling, work inside engine rooms, and other pre-assembly works are consolidated into the "wiring/piping and communication equipment."

Installation of instrument panels, pedals, floor mats, ceiling linings, side logs, and headlights, and other interior works are consolidated into the "interior equipment."

Installation of suspensions, (tires), engines, and other underside installation works are consolidated into the "underside equipment." Tires are basically installed in the following exterior works, but may be installed in this underside equipment zone.

Installation of tires, windowpanes, bumpers, doors and seats, engine room post-works, and other exterior works are consolidated into the "exterior equipment."

Figure 5:
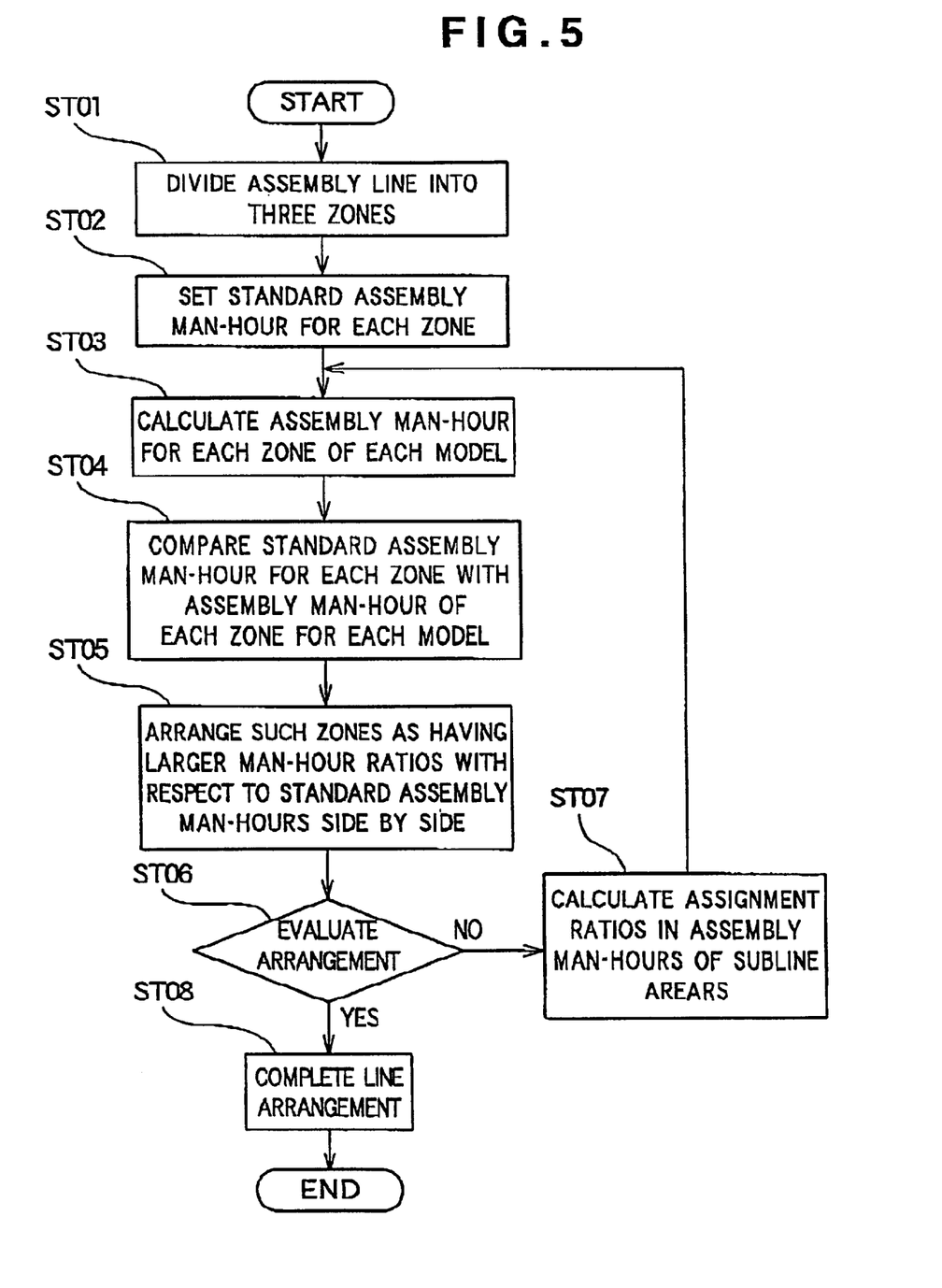
FIG. 5 is a flowchart of the configuring method.

Next, with reference to the flow chart in FIG. 5, the method of the present invention is described. Reference sign "STxx" denotes a step number.

ST01: Divide the assembly line into at least three "zones."

ST02: Then, set "standard assembly man-hours" for each zone.

ST03: Next, calculate "assembly man-hours of each zone" for each of a plurality of models.

ST04: Then, compare the "standard assembly man-hours" for each zone with the "assembly man-hours of each zone" for each of the plurality of models.

ST05: Next, arrange such "zones" as having larger man-hour ratios with respect to the "standard assembly man-hours" side by side.

ST06: Evaluate the arrangement at ST05. When it is good, proceed to ST08. When it is bad, proceed to ST07.

ST07: When the decision is "NO" at ST06, calculate the assignment ratios in assembly man-hours of the subline areas. The subline areas (101 to 105) shown in FIG. 1 are divided for each model into ones synchronous with the assembly line 10 for assembly and asynchronous ones with storage capacity. Upon an attempt to level the man-hours of the respective zones, such zones as having higher man-hour ratios are laid side by side.

Then, return to ST04, repeat ST04, ST05, and ST06 until the decision is "YES" at ST06.

ST08: The decision is YES at ST06, finish the line arrangement.

Figure 6:
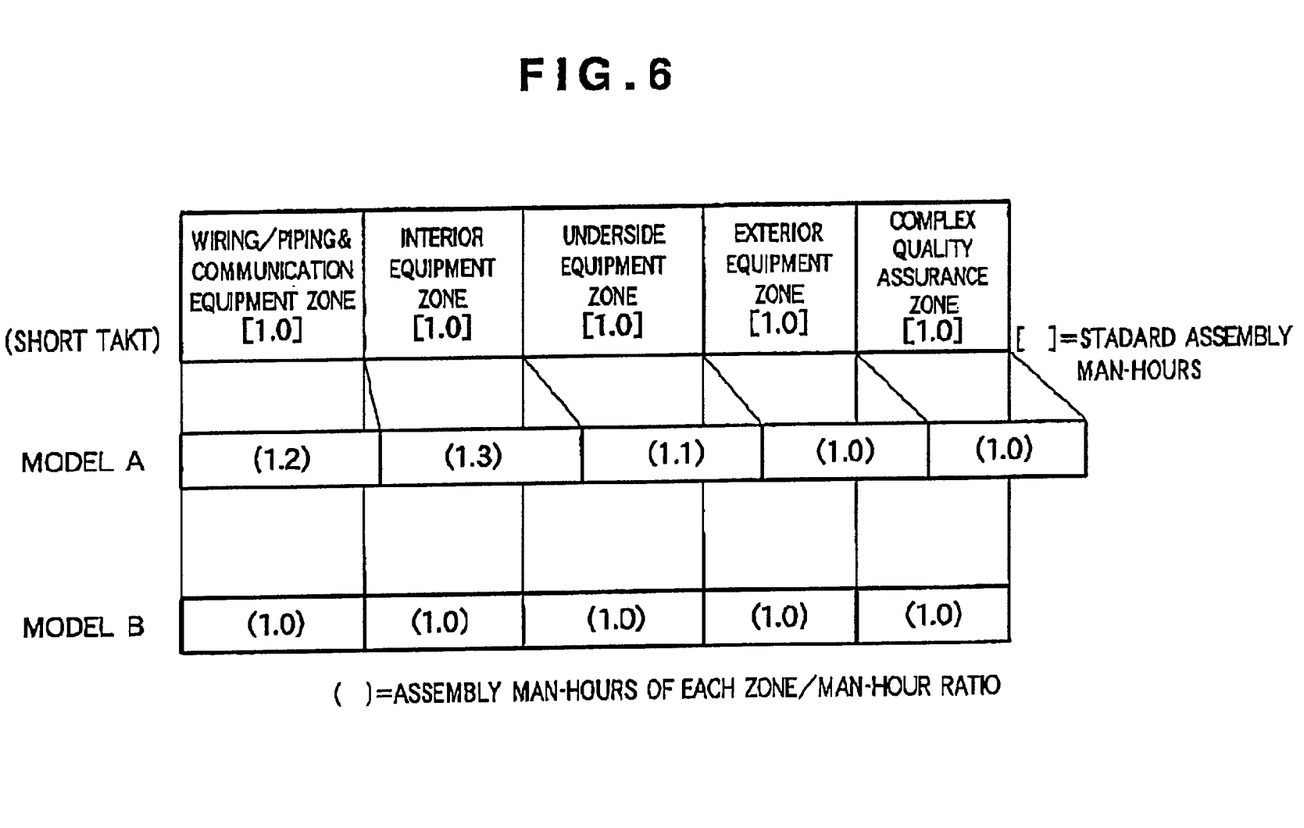
FIG. 6 is an explanatory view of man-hour calculation for each model in the configuring method.

Next, with reference to FIG. 6, an example of the line arrangement (ST08) in FIG. 5 is described.

Standard assembly man-hours common for the different models (assembly man-hour for a standard model) are set for each zone. These are defined as [1.0] in all zones. For models "A" and "B" having respective different constant assembly man-hours, a man-hour ratio of the assembly man-hours thereof to the standard assembly man-hours (assembly man-hours of each zone) is calculated for each zone. The wiring/piping and communication equipment zone and the interior equipment zone which take the top two ranks in the man-hour ratios for the model "A" are laid side by side (both are in random order). The underside equipment zone having the next higher man-hour ratio is laid adjacent to the top two zones. The exterior equipment zone and the complex quality assurance zone of constant man-hours are laid adjacent to the underside equipment zone. Thus the line is organized.

Even when the zoning is the grouping of items to be assembled based on their functions for convenience in working, the subline areas (101 to 105) allow the adjustment of the difference in man-hours between the zones in the assembly line 10.

Figure 3:
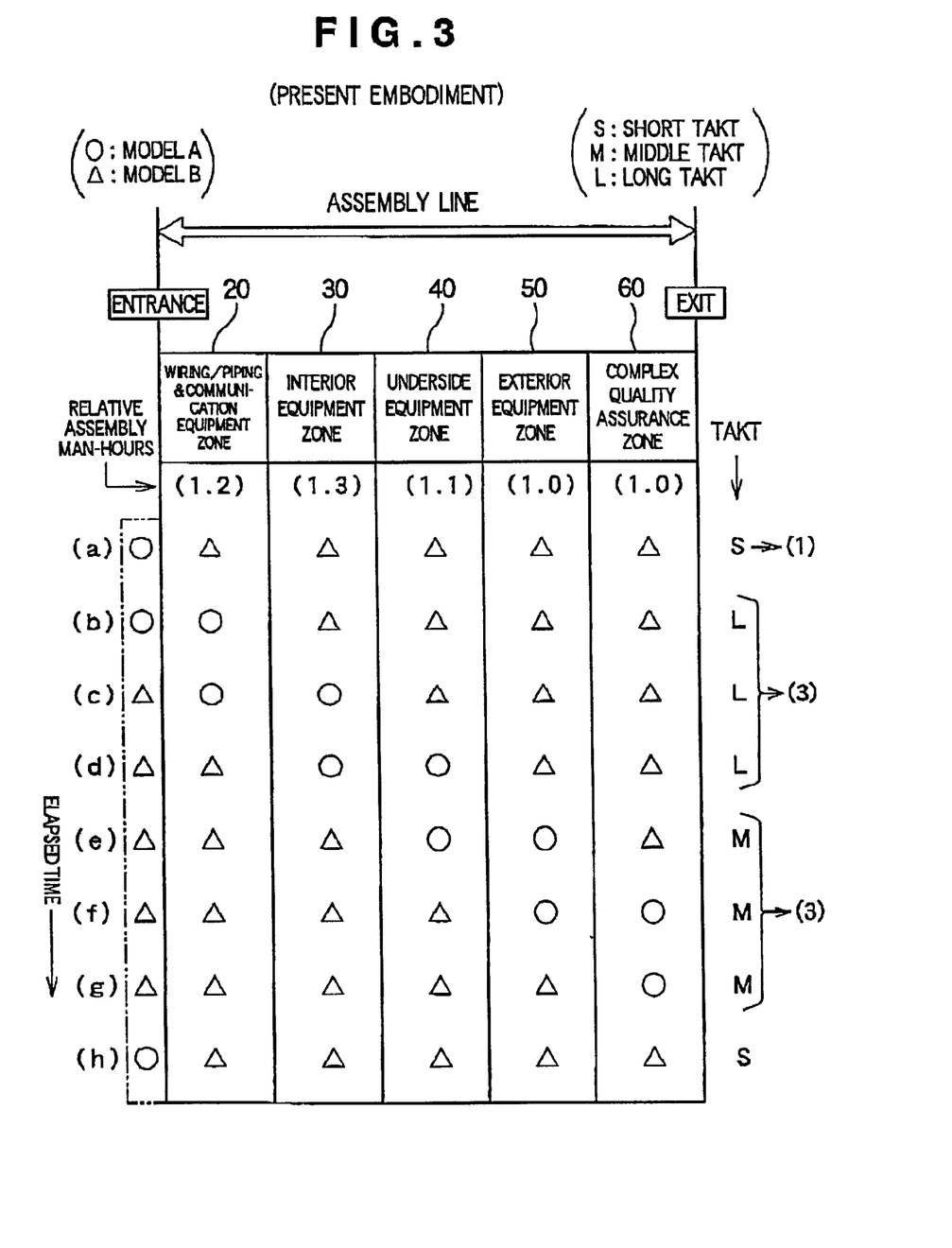
FIG. 3 is an explanatory view illustrating takt time variations in the vehicle assembly line.

FIG. 3 illustrates variations in takt time of the vehicle assembly line according to the present invention. The assembly line is divided, from the entrance to the exit, into five zones: the wiring/piping and communication equipment zone; interior equipment zone; underside equipment zone; exterior equipment zone; and complex quality assurance zone. In the assembly line of this configuration, vehicles of model "A" indicated by reference mark ○ and vehicles of model "B" indicated by Δ, respectively having different assembly man-hours, flow in a mixed manner for assembly. Elapsed time during the assembly is patterned as (a) to (h).

A vehicle of ○ (model "A") is a luxury car having a larger number of components and assembly man-hours. A vehicle of Δ (model "B") is a popular car having a smaller number of components and assembly man-hours as compared with model "A."

In the classification of takt time shown in the right column of the figure, "S" denotes a short takt time, "M" a middle takt time, and "L" a long takt time. "S" corresponds to a higher line speed, "L" a lower line speed, and "M" a middle speed between those speeds.

At (a), although a vehicle of ○ (model "A") comes at the entrance, vehicles of Δ (model "B") flow in all the zones, so that the takt time can be set in S (short takt).

At (b), the vehicle of ○ (model "A") at (a) has come into the wiring/piping and communication equipment zone. The vehicle of ○ (model "A") is in the line and this vehicle of ○ (model "A") takes time in assembly, so that the setting of the takt time is switched to "L" (long takt).

At (c) and (d), vehicles of ○ (model "A") flow in the interior equipment zone having the largest number of assembly man-hours, so that the takt time is maintained in "L" (long takt).

At (e), flowing in the piping/wiring and communication equipment zone and the interior equipment zone are vehicles of Δ (model "B") having the smaller number of relative assembly man-hours as described above, and the vehicles of ○ (model "A") are flowing in the underside equipment zone and the exterior equipment zone having the smaller number of relative man-hours, so that idle time is produced in the assembly.

Thus the takt time can be switched to "M" (middle takt) so as to increase the line speed.

At both (f) and (g), vehicles of Δ (model "B") are flowing in the wiring/piping and communication equipment zone and the interior equipment zone, and the vehicles or ○ (model "A") are flowing between the underside equipment zone and the complex quality assurance zone, so that the takt time is maintained in "M" (middle takt).

(h) is the state returned to (a) and vehicles of Δ (model "B") are flowing in all of the zones, so that the takt time is switched to S (short takt).

Figure 4:
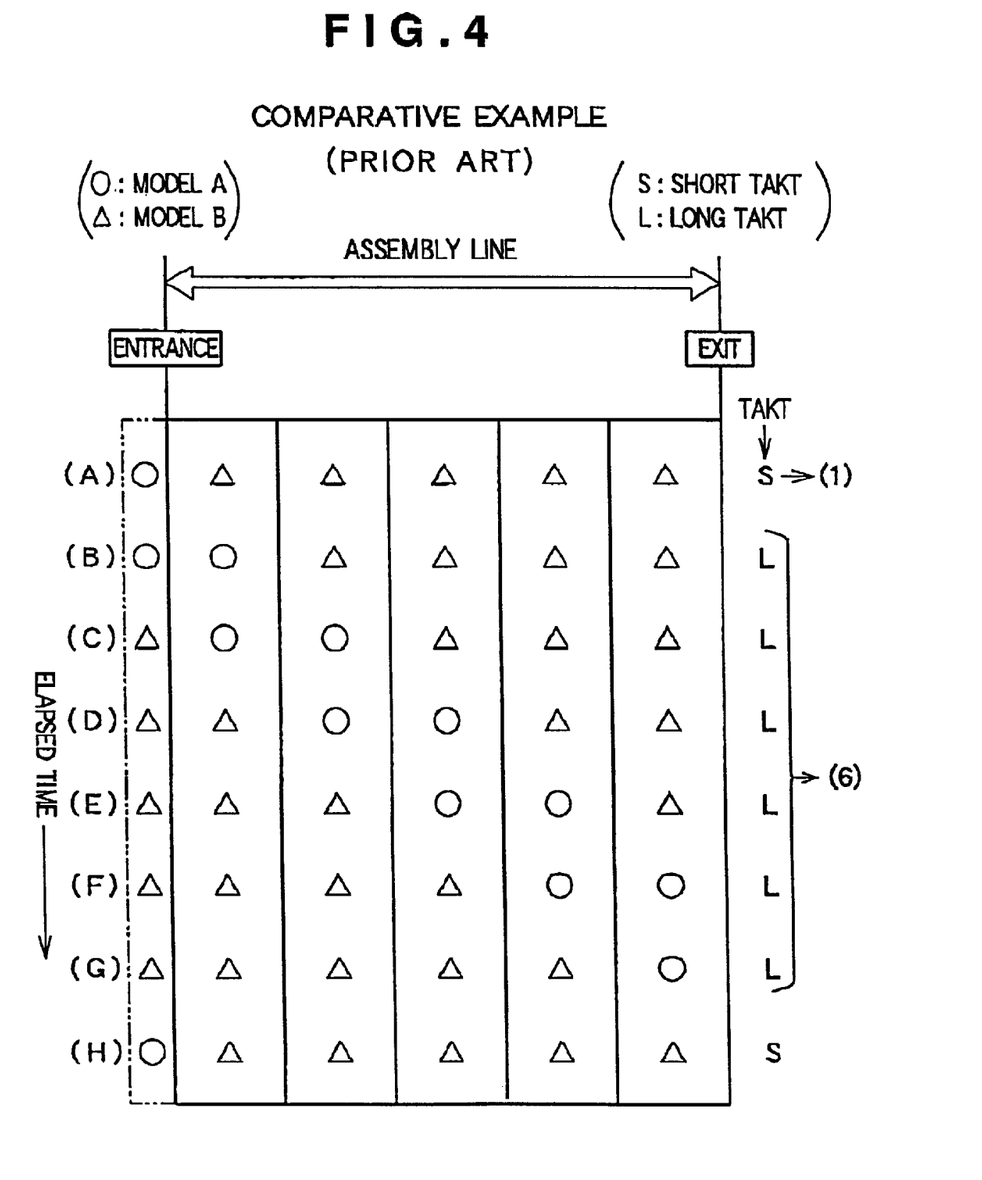
FIG. 4 is a schematic diagram illustrating conventional takt time variations in a comparative example as compared to those of FIG. 3.

FIG. 4 illustrates a comparative example corresponding to the conventional example with respect to FIG. 3. All except the absence of zones (Zoning is not performed in FIG. 4.) is the same as in FIG. 3.

(A): Since vehicles of Δ (model "B") are present in the assembly line, "S" (short takt) is selected.

(B): Since a vehicle of ○ (model "A") has come into the assembly line, the takt time is switched to "L" (long takt).

(C) to (G): Since a vehicle(s) of ○ (model "A") are present in the assembly line, the takt time is maintained in "L" (long takt).

(H): Since the assembly line has no vehicles of ○ (model "A") but vehicles of Δ (model "B"), the takt time is switched to "S" (short takt). That is, the slate is returned to (A).

In the classification of the takt time illustrated in the right end of the FIG. 4, "S" counts one and "L" counts six. (H) is identical to (A) and the takt time thereof is not counted. Suppose that "S" (short takt) is 64 sec/vehicle and "L" (long takt) is 67 sec/vehicle, the following calculation easily provides an average takt time:

Average takt time=$(67 \times 6 + 64 \times 1)/7 = 66.6$

Thus the average takt time in the figure will be about 66.6 sec/vehicle.

In contrast, in the classification of the takt time illustrated in the right end of FIG. 3, "S" counts one, "L" counts three and "M" counts three. (h) is identical to (a) and the takt time thereof is not counted. Suppose "S" (short takt) is 64 sec/vehicle, "L" (long takt) 67 sec/vehicle, and "M" (middle takt) 65 sec/vehicle, the following calculation easily provides an average takt time:

Average takt time=$(67 \times 3 + 65 \times 3 + 64 \times 1)/7 = 65.7$

Thus the average takt time in the FIG. 3 will be about 65.7 sec/vehicle.

As described above, the takt time has been conventionally switched between "S" (short takt) and "L" (long takt). The present invention switches between three takt times of "S" (short takt), "L" (long takt) and "M" (middle takt). The present invention thus interposes "M" (middle takt), thereby successfully increasing production efficiency.

In FIG. 3, the assembly line is divided into five zones. The present invention is, however, implemented with at least three zones. Even with three zones, setting standard assembly man-hours for each zone, comparing between the standard assembly man-hours and assembly man-hours of each zone for each of a plurality of models, and laying side by side the zones having first and second largest numbers of assembly man-hours can embody the present invention.

In other words, if the zones having the first and second largest numbers of assembly man-hours are spaced apart from one another, the time or switching the takt time from "L" to "M" is delayed, increasing the proportion of "L", and resulting in the decreased proportion of "M." In order to promptly switch from "L" to "M" (or from "M" to "L"), it is required to "lay the zones having the first and second largest numbers of assembly man-hours side by side."

In FIG. 3, the interior equipment zone as the zone having the largest number of assembly man-hours and the wiring/piping and communication equipment zone as the next largest zone are laid side by side and arranged near the entrance of the assembly line. These two zones may be arranged near the ext.

Alternatively, these zones may be arranged in some middle portion of the assembly line. The point is that disposing the zones having the first and second largest numbers of assembly man-hours side by side in the assembly line enables switching to "M" (middle takt).

In the above embodiment, specific terms such as "interior equipment zone" are used for easy understanding, which are not intended to limit the zones thereto. Zoning may be performed based on suitability for switching the line takt time for arranging the line.

INDUSTRIAL APPLICABILITY

The above configuration allows a common vehicle assembly line for assembling vehicle bodies of different models to be operated at three speeds: a long takt time, a middle takt time, and a short takt time. This results in an increased average speed of the line, improving vehicle productivity, and therefore is useful in manufacturing vehicles.

What is claimed is:

1. A method of configuring a vehicle assembly line through which vehicle bodies of a plurality of different models having undergone painting are transferred, during which components are sequentially installed, inspected, and repaired as necessary, to provide finished vehicles of the different models wherein the different models include a standard model and each require a different number of assembly man-hours for assembly thereof, said method comprising the steps of:

grouping said components to be installed based on mounting positions, installing procedures, and functions thereof so as to divide said vehicle assembly line into at least three zones;

providing subline areas each for a respective one of the divided at least three zones so as to prepare and supply subassemblies to the corresponding zones, the subassemblies each composed of a group of components of the grouped components;

setting a number of standard assembly man-hours for each divided zone based on a number of assembly man-hours of the standard model;

performing comparison for each divided zone between said standard assembly man-hours and a number of assembly man-hours of each of the different models to be assembled so as to determine a maximum positive offset in the assembly man-hours of the different models from the standard assembly man-hours;

determining whether or not two adjacent zones of the at least three zones have first and second largest maximum positive offsets, respectively, among all of the maximum positive offsets; and adjusting an amount of supply of the subassemblies from at least one of the sublines to the corresponding zone until two adjacent zones of the at least three zones have said first and second largest maximum positive offsets, respectively.

2. A method of configuring a vehicle assembly line, as set forth in claim 1, further comprising the step of setting said vehicle assembly line to run in a long takt time when vehicles of a model having a larger number of assembly man-hours are present in said two adjacent zones, and to run in a middle takt time when a vehicle of a model having a larger number of assembly man-hours is present in any zone other than said two adjacent zones, and to run in a short takt time when no vehicles of a model having a larger number of assembly man-hours are present in said assembly line.

3. A method of configuring a vehicle assembly line, as set forth in claim 1, wherein said at least three zones comprise a wiring/piping and communication equipment zone, an interior equipment zone, an underside equipment zone, an exterior equipment zone, and a complex quality assurance zone that are disposed in the order named when viewed from an upstream end of the vehicle assembly line, and said two adjacent zones consist of the wiring/piping and communication equipment zone and the interior equipment zone.

4. A method of configuring a vehicle assembly line, as set forth in claim 1, wherein said setting step is carried out by setting the number of standard assembly man-hours for each zone as 1.0, and before the comparison performing step, further comprising the step of calculating as said assembly man-hours of said respective zones for each of said different models in terms of man-hour ratios relative to the standard assembly man-hours being set as 1.0.

5. A method of configuring a vehicle assembly line, as set forth in claim 1, wherein said subline areas also operative to level out the assembly man-hours of all of the zones at an initial stage assembling of the components on the vehicle assembly line.

* * * * *